US010362761B2

(12) United States Patent
Stella

(10) Patent No.: US 10,362,761 B2
(45) Date of Patent: Jul. 30, 2019

(54) ANIMAL ENCLOSURE

(71) Applicant: Michael A. Stella, New Harmony, UT (US)

(72) Inventor: Michael A. Stella, New Harmony, UT (US)

(*) Notice: Subject to any disclaimer, the term of this patent is extended or adjusted under 35 U.S.C. 154(b) by 358 days.

(21) Appl. No.: 15/155,952

(22) Filed: May 16, 2016

(65) Prior Publication Data

US 2016/0330928 A1 Nov. 17, 2016

Related U.S. Application Data

(60) Provisional application No. 62/162,622, filed on May 15, 2015.

(51) Int. Cl.
*A01K 1/00* (2006.01)
*A01K 1/015* (2006.01)
*A01K 1/03* (2006.01)

(52) U.S. Cl.
CPC ............ *A01K 1/0035* (2013.01); *A01K 1/015* (2013.01); *A01K 1/03* (2013.01); *A01K 1/034* (2013.01)

(58) Field of Classification Search
CPC .. A01K 1/0035; A01K 1/0157; A01K 1/0151; A01K 1/015; A01K 1/02; A01K 1/0236; A01K 1/0245; A01K 1/03; A01K 1/032; A01K 1/033; A01K 1/034; A01K 1/035; A01K 1/0218
See application file for complete search history.

(56) References Cited

U.S. PATENT DOCUMENTS

| | | | |
|---|---|---|---|
| 3,905,334 A * | 9/1975 | Stevenson | A01K 1/0151 108/57.29 |
| 3,921,350 A | 11/1975 | Van Schoyck | |
| 4,258,662 A | 5/1981 | Schafer | |
| 4,329,939 A | 5/1982 | Christie et al. | |
| 4,362,128 A | 12/1982 | Downey | |
| 4,885,882 A | 12/1989 | Forshee | |
| 5,070,664 A | 12/1991 | Groh et al. | |
| 5,476,066 A | 12/1995 | Hoffman | |
| 5,913,784 A | 6/1999 | Hite | |
| 6,453,630 B1 | 9/2002 | Buhrts et al. | |
| 6,599,615 B2 | 7/2003 | Burke, III et al. | |
| 2002/0020033 A1 | 2/2002 | Lang | |
| 2004/0144328 A1* | 7/2004 | Bonner | A01K 1/03 119/455 |
| 2008/0104914 A1 | 5/2008 | Lemieux | |

FOREIGN PATENT DOCUMENTS

CN 201809688 4/2011

* cited by examiner

*Primary Examiner* — Jessica B Wong
(74) *Attorney, Agent, or Firm* — Thorpe North & Western, LLP.

(57) ABSTRACT

An animal enclosure may include a planar floor having a first and a second side. Walls may be attached to the second side of the planar floor in proximity to edges of the planar floor, and a plurality of joists between the walls supporting the planar floor. A first flange portion may cover a portion of the planar floor and a second flange portion may cover a portion of a wall. A corner flange may extend a perimeter of the floor and the walls to resist wear and fluid damage. A raised animal bed may be disposed above the floor and a drain for hygienic purposes. A layer of elastomeric material is disposed over the planar floor, corner flange, and walls. Fence segments each have a frame attached to the plurality of walls to enclose an animal.

15 Claims, 4 Drawing Sheets

ANIMAL ENCLOSURE

BACKGROUND

Animals have been vital to humans for survival and companionship for many centuries. Some animals are raised for food and clothing while other animals are raised primarily for companionship. Dogs and cats are examples of domestic animals that are bred and maintained for human companionship.

In order to make the lives of domestic animals more comfortable, many types of animal enclosures and animal beds have been developed. For larger animals such as large dogs, these animal enclosures may be outside enclosures that prevent the animal from leaving an area (e.g., a dog run or dog house) and provide a place for the dog to rest, eat and sleep.

DETAILED DESCRIPTION

Figure 1:
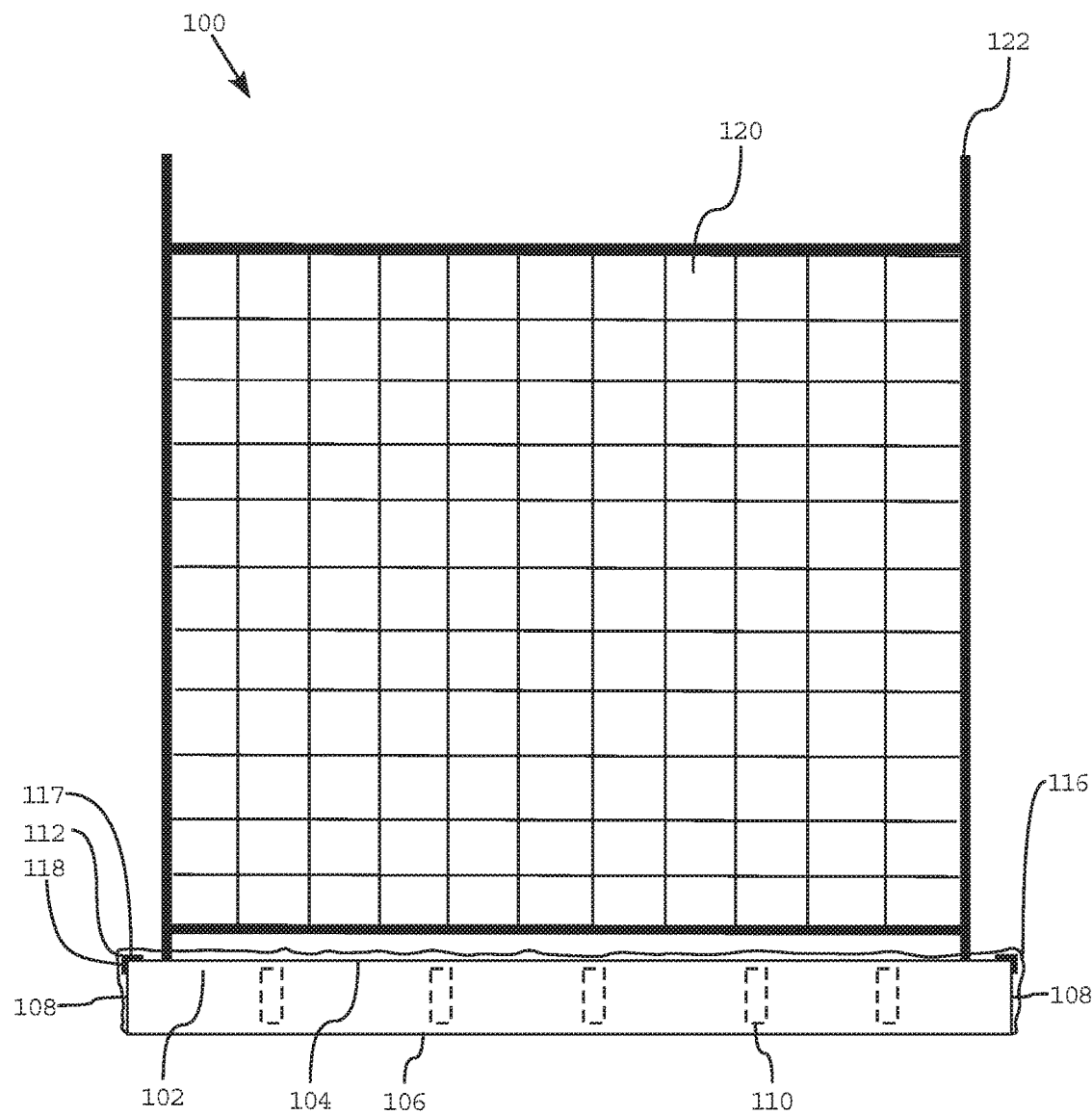
FIG. 1 is a diagram illustrating an example of orthogonal view of an animal enclosure.

The present technology provides an animal enclosure 100 that comprises a planar floor 102 having first planar side 104 and optionally having a second planar side 106. The planar floor may be made of wood, metal or plastic. For example, the planar floor may be a ¼ inch up to a 3 inch manufactured wood product in a single sheet. As an alternative example, the planar floor 102 may be a metal sheet that is 1/16 to 3/16 of an inch or another thickness of metal. The planar floor 102 may also be a solid sheet or a sheet that has metal grating or plastic grating (e.g., apertures may be formed in the planar floor). A plurality of walls 108 may be attached to the first planar side 104 of the planar floor 102 in proximity to the edges of the planar floor 102. A plurality of joists 110 may be disposed inside the walls between the plurality of walls 108 and attached to the walls 108 and/or the planar floor 102 to support the planar floor 102.

A corner flange 112 may be provided with a first flange portion 117 covering a portion of the planar floor 102 and second flange portion 118 covering a portion of one of the plurality of walls 108. The animal enclosure 100 may include a layer of elastomeric material 116 disposed over the planar floor 102, corner flanges 112, and the plurality of walls 108. The elastomeric material may be a urethane or polyurethane that is sprayed or painted onto the surface. The elastomeric material may also contain small chunks of ground up rubber or synthetic rubber (e.g., ground rubber from tennis balls, tires or virgin ground synthetic rubber). The elastomeric material can protect the animal who uses the planar floor 102 from getting sores, callouses or other skin and bone maladies.

Attached to the top of the planar floor 102 of the animal enclosure 100 may be a plurality of fence segments 120 each having a frame 122. The fence segments 120 may be attached to the planar floor 102 and/or plurality of walls 108 to retain the fence segments and enclose an animal. Examples of the animals that may be enclosed by animal enclosure may include dogs, pigs, goats, sheep and other domestic and non-domestic animals.

Figure 2:
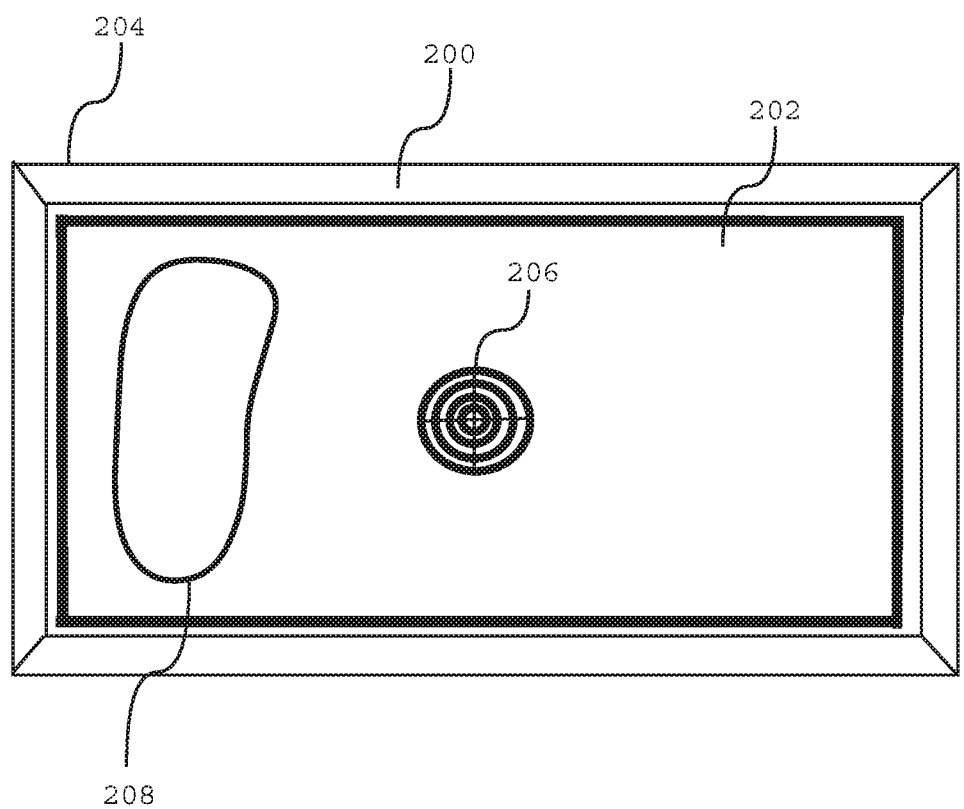
FIG. 2 is an example top view of a planar floor and drain for an animal enclosure.

As illustrated in FIG. 2, a corner flange 200 may extend around a perimeter of the planar floor 202 to cover a perimeter joint between the planar floor 202 and the plurality of walls 204. The corner flange 200 may resist wear and may also assist in resisting the entry of water into the joint between the planar floor and the walls. The corner flange 200 may be metal or plastic. For example, the metal flange may be steel, aluminum or brass.

The planar floor may also include a fluid drain 206 disposed in the planar floor 202. The fluid drain 206 may allow animal fluid, rain, snow or wash water to drain from the planar floor so that the water will be drained away from the animal that may be located in the animal enclosure. This provides a hygienic animal enclosure for the animal to prevent disease, for example.

An animal bed area 208 may be attached to the planar floor 202. For example an additional piece of wood may be attached to the planar floor 202 or be formed as part of the floor 202 such that the bed 208 is raised above the planar floor 202 and the drain 206. The bed 208 may be used by the animal to rest or lay upon above the planar floor 202. This further facilitates a hygienic animal enclosure because the animal will be raised above the planar floor 202 that may have rain, snow, or animal fluid thereupon. This animal bed area may be disposed on the planar floor 202 before or after the planar floor 202 is covered with elastomeric material. In another example, a foam rubber or similar synthetic foam material may be attached to the planar floor to form the bed 208. However, an animal bed area 208 that is made of foam may be attached after the elastomeric material has been applied using glue or mechanical fasteners because the elastomeric material does not stick well to synthetic foam. The animal bed area may be attached to the planar floor using threaded fasteners (e.g., screws), threaded bolts or other existing fasteners.

Figure 3:
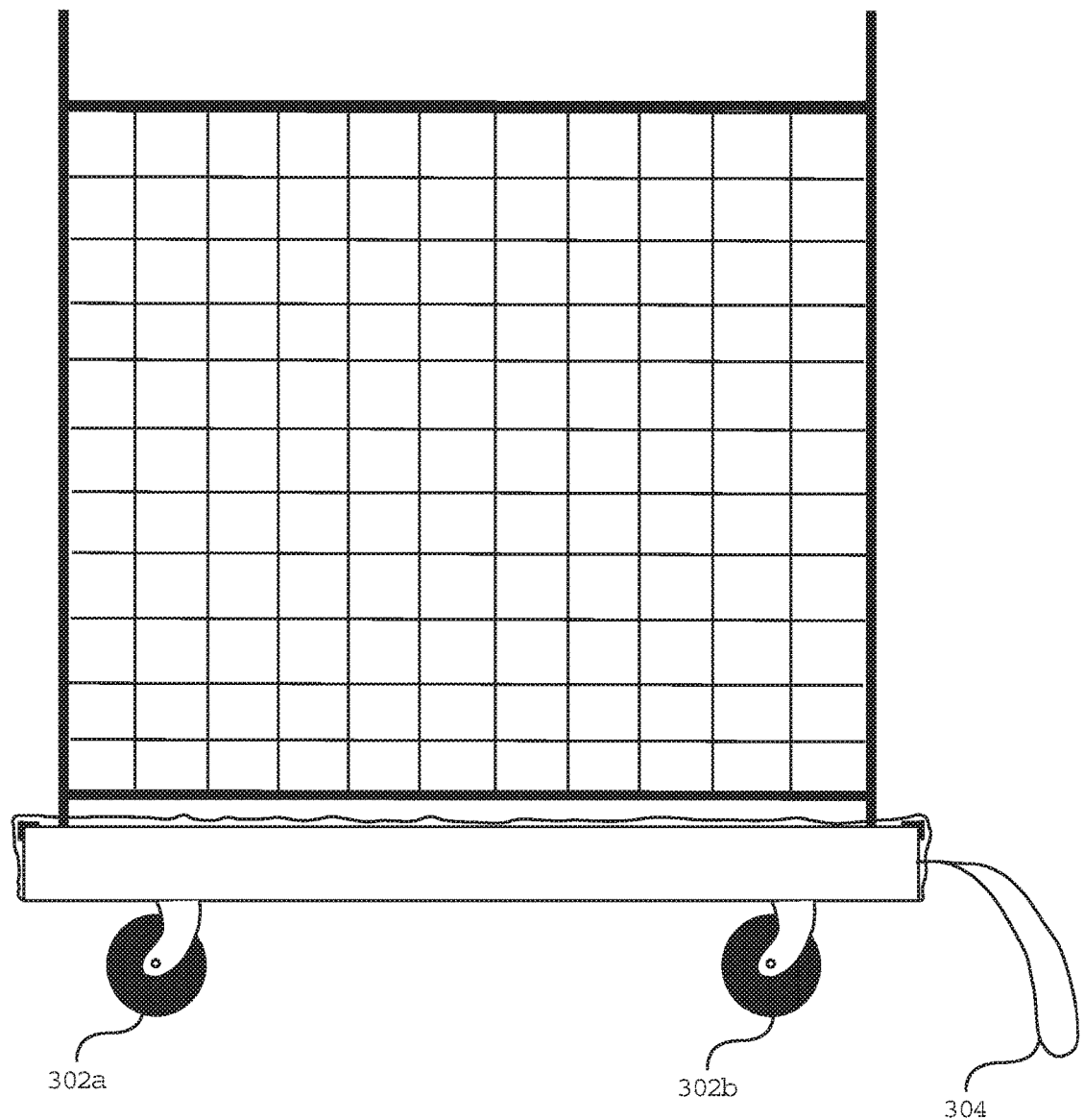
FIG. 3 is a diagram illustrating an example of orthogonal view of an animal enclosure that has wheels and a tow member.

FIG. 3 illustrates that the animal enclosure may include a plurality of wheels 302a-b attached to the plurality of walls, the first side of the planar surface, or the joists. The wheels may be casters, bicycle style wheels, solid rubber wheels or other existing wheel configurations.

The animal enclosure may include a towing member 304 attached to the animal enclosure to enable towing of the animal enclosure. The towing member may be a fiber rope, a plastic rope, a plastic cord, a plastic chain, a metal cable, a metal chain or another strap or rope like member.

Figure 4:
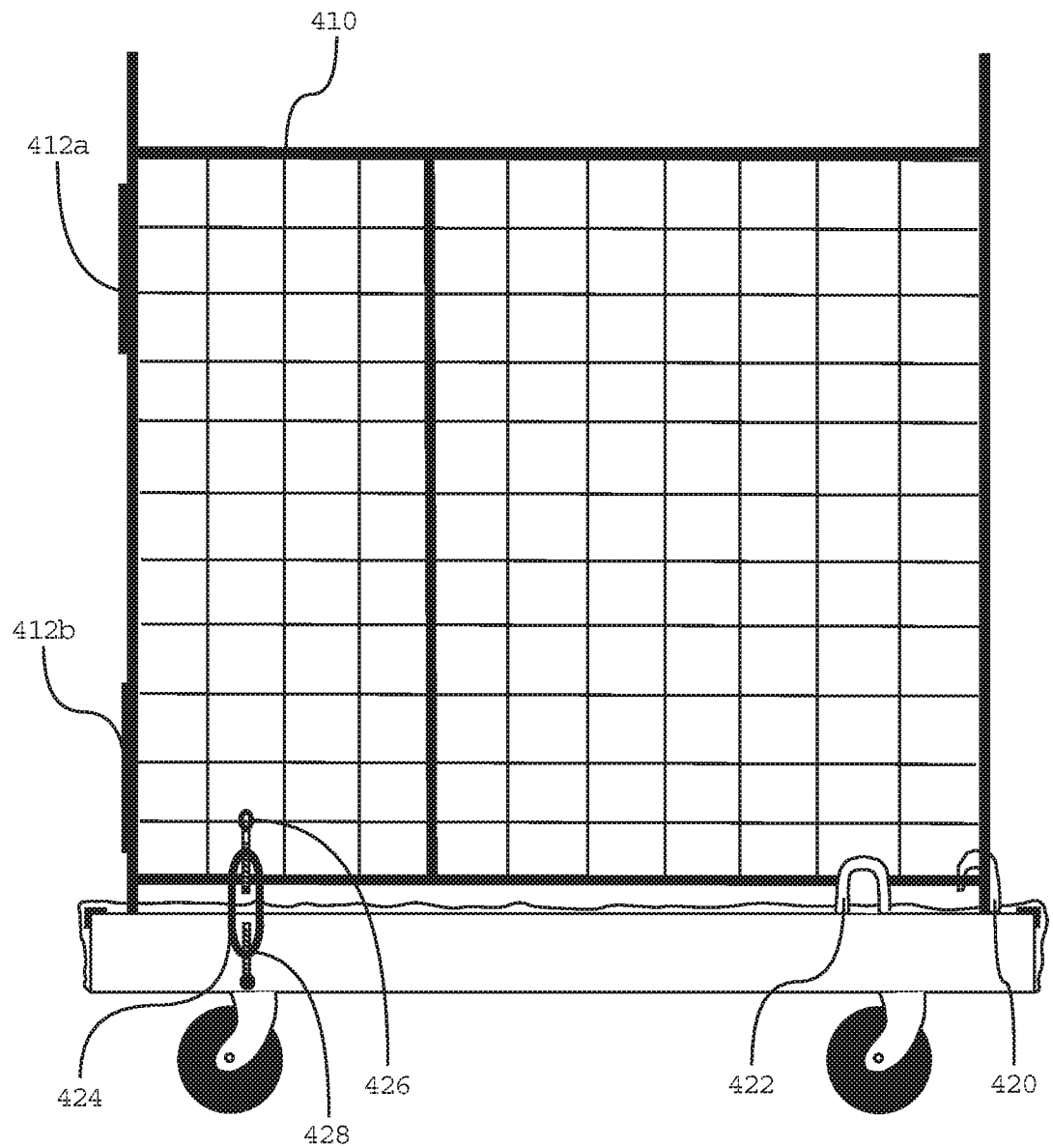
FIG. 4 is an example of an animal enclosure with various fasteners for attaching fence segments to the planar floor.

FIG. 4 illustrates that the animal enclosure may further comprise a gate 410 located in one of the plurality of fence segments. The gate may be a hinged gate with hinges 412a-b or another type of removable gate. A plurality of metal hooks 420 or metal eye loops 422 may be attached to the plurality of walls using screws or other retaining systems to retain the fence segments. Further a plurality of screw hooks and/or screw eyes 426, 428 may be used to attach the fence segments to the plurality of walls using a plurality of screw harnesses 424.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. An animal enclosure, comprising:
   a planar floor having a first side;
   a plurality of walls attached to the first side of the planar floor in proximity to edges of the planar floor, the plurality of walls extending downwardly relative to the planar floor for resting on a ground surface;
   a plurality of joists attached to the planar floor and situated between the plurality of walls supporting the planar floor, wherein the plurality of joists are attached to opposing walls of the plurality of walls;
   a perimeter joint between the planar floor and the plurality of walls;
   a corner flange having a first flange portion covering a portion of the planar floor and second flange portion covering a portion of each of the plurality of walls, wherein the corner flange covers the perimeter joint and extends around a perimeter of the planar floor;
   a layer of elastomeric material disposed over the planar floor, the corner flange, and the plurality of walls; and
   a plurality of fence segments each having a frame, wherein the fence segments are attached to the planar floor or the plurality of walls to retain the fence segments and enclose an animal.

2. The animal enclosure of claim 1, wherein the elastomeric material is urethane.

3. The animal enclosure of claim 1, wherein the corner flange is metal or plastic.

4. The animal enclosure of claim 1, further comprising a fluid drain disposed in the planar floor.

5. The animal enclosure of claim 1, further comprising a plurality of wheels attached to the plurality of walls.

6. The animal enclosure of claim 5, wherein the plurality of wheels are casters.

7. The animal enclosure of claim 5, further comprising a towing member attached to animal enclosure to enable towing of the animal enclosure.

8. The animal enclosure of claim 7, wherein the towing member is at least one of a fiber rope, a plastic rope, a plastic cord a plastic chain, a metal cable, or a metal chain.

9. The animal enclosure of claim 1, wherein the planar floor is ¾ inch manufactured wood product in a single sheet.

10. The animal enclosure of claim 1, wherein the planar floor is metal grating or plastic grating.

11. The animal enclosure of claim 1, further comprising a gate located in one of the plurality of fence segments.

12. The animal enclosure of claim 1, further comprising a plurality of metal hooks or metal eye loops attached to the plurality of walls to retain the fence segments.

13. The animal enclosure of claim 1, further comprising a plurality of screw hooks and screw eyes that attach the fence segments to the plurality of walls using a plurality of screw harnesses.

14. A portable animal enclosure assembly, comprising:
    a planar floor having a first side;
    a plurality of walls attached to the first side of the planar floor in proximity to edges of the planar floor, the planar floor and the walls defining a perimeter joint portion at the intersection of the planar floor and the walls about a perimeter of the floor;
    a corner flange extending around the perimeter of the floor and covering the joint portion, the corner flange configured to resist wear and resist entry of fluid into the joint portion;
    a plurality of wheels attached to the plurality of walls; and
    a plurality of fence segments each having a frame, wherein the fence segments are attached to the planar floor or the plurality of walls to retain the fence segments and enclose an animal.

15. The portable animal enclosure of claim 14, further comprising a tow rope to enable an operator to move the portable enclosure about the wheels.

* * * * *